(12) United States Patent
Cerjak et al.

(10) Patent No.: US 8,186,141 B2
(45) Date of Patent: May 29, 2012

(54) METHOD FOR PRODUCING WELDED ROUND AND PROFILE CHAINS, CHAIN LINKS FOR A ROUND OR PROFILE CHAIN AND ROUND OR PROFILE CHAIN MADE OF CHAIN LINKS OF SAID KIND

(75) Inventors: Horst-Hannes Cerjak, Graz (AT); Aegyd Pengg, Poertschach (AT); Franz Fuchs, Kapfenberg (AT)

(73) Assignee: Technische Universitaet Graz, Graz (AT)

( * ) Notice: Subject to any disclaimer, the term of this patent is extended or adjusted under 35 U.S.C. 154(b) by 85 days.

(21) Appl. No.: 12/809,811

(22) PCT Filed: Dec. 18, 2008

(86) PCT No.: PCT/EP2008/010842
§ 371 (c)(1),
(2), (4) Date: Jun. 21, 2010

(87) PCT Pub. No.: WO2009/080289
PCT Pub. Date: Jul. 2, 2009

(65) Prior Publication Data
US 2010/0269479 A1 Oct. 28, 2010

(30) Foreign Application Priority Data
Dec. 20, 2007 (DE) .......................... 10 2007 061 512

(51) Int. Cl.
*F16H 9/24* (2006.01)
*F16G 1/24* (2006.01)
*B23K 20/12* (2006.01)

(52) U.S. Cl. ........... 59/31; 59/22; 59/35.1; 59/78; 59/84

(58) Field of Classification Search ................... 59/1, 22, 59/25, 31, 32, 35.1, 78, 84; 228/2, 113
See application file for complete search history.

(56) References Cited

U.S. PATENT DOCUMENTS

| | | | |
|---|---|---|---|
| 2,144,319 | A | 1/1939 | Taylor |
| 6,539,700 | B2 * | 4/2003 | Linnenbrugger ................ 59/31 |
| 2004/0256439 | A1 | 12/2004 | Pfeiler |
| 2006/0053766 | A1 | 3/2006 | Breghoff et al. |
| 2006/0157538 | A1 | 7/2006 | Crasser |

FOREIGN PATENT DOCUMENTS

| | | |
|---|---|---|
| DE | 29 15 418 A1 | 10/1980 |
| DE | 82 09 525 U1 | 7/1982 |
| DE | 32 12 360 C1 | 7/1983 |
| DE | 20 2004 014 062 U1 | 12/2004 |
| DE | 103 33 783 A1 | 2/2005 |
| EP | 1 459 833 A1 | 9/2004 |
| GB | 605645 | 7/1948 |
| GB | 870742 | 6/1961 |
| SU | 1181828 A | 9/1985 |
| WO | WO 87/02283 | 4/1987 |

* cited by examiner

*Primary Examiner* — David Jones
(74) *Attorney, Agent, or Firm* — Patterson Thuente Christensen Pedersen, P.A.

(57) ABSTRACT

A method for producing welded round and profile chains of chain links that are connected to each other. The chain links for round and profile chains produced by this method include two chain link partial pieces that are connected to each other by friction welding.

18 Claims, 5 Drawing Sheets

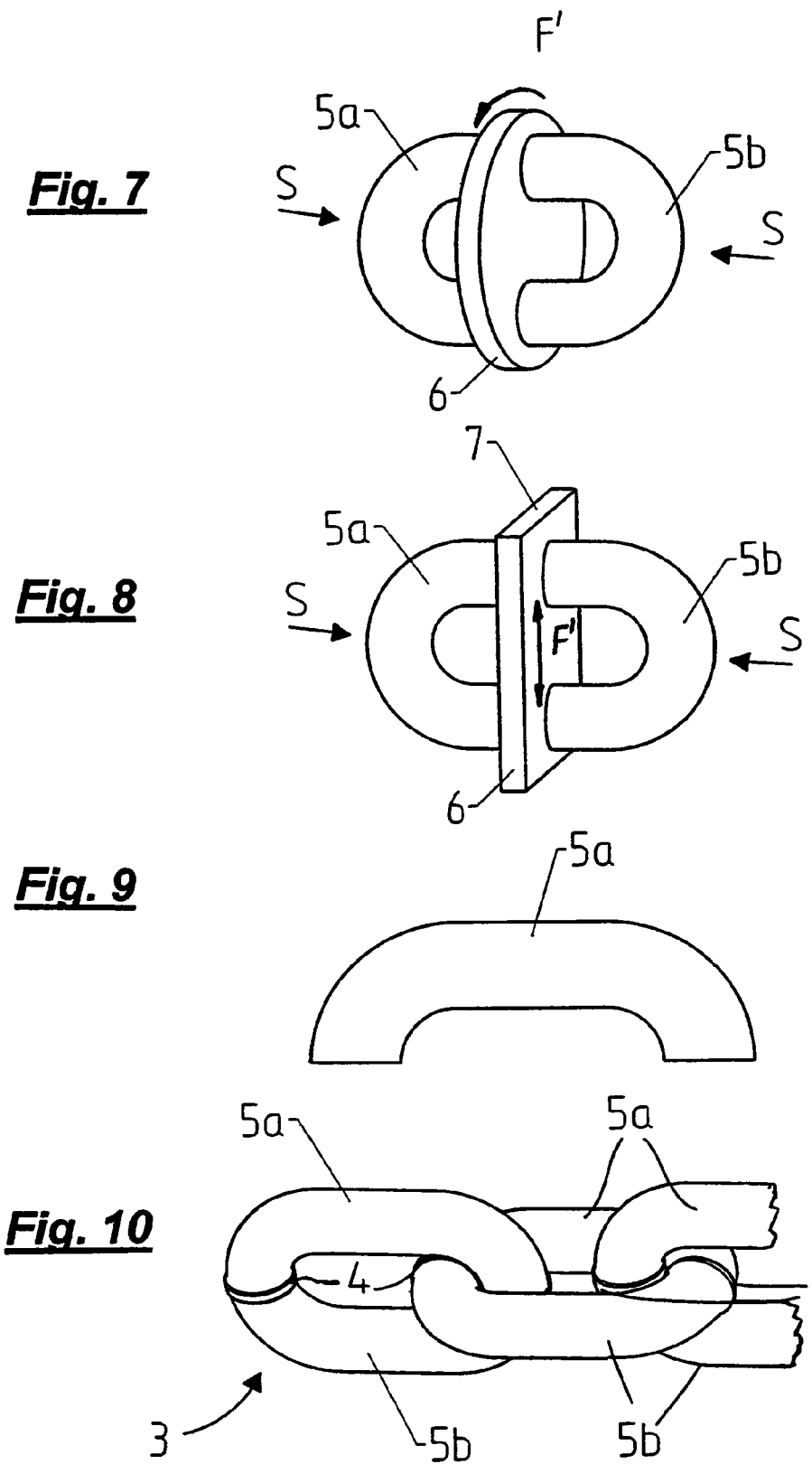

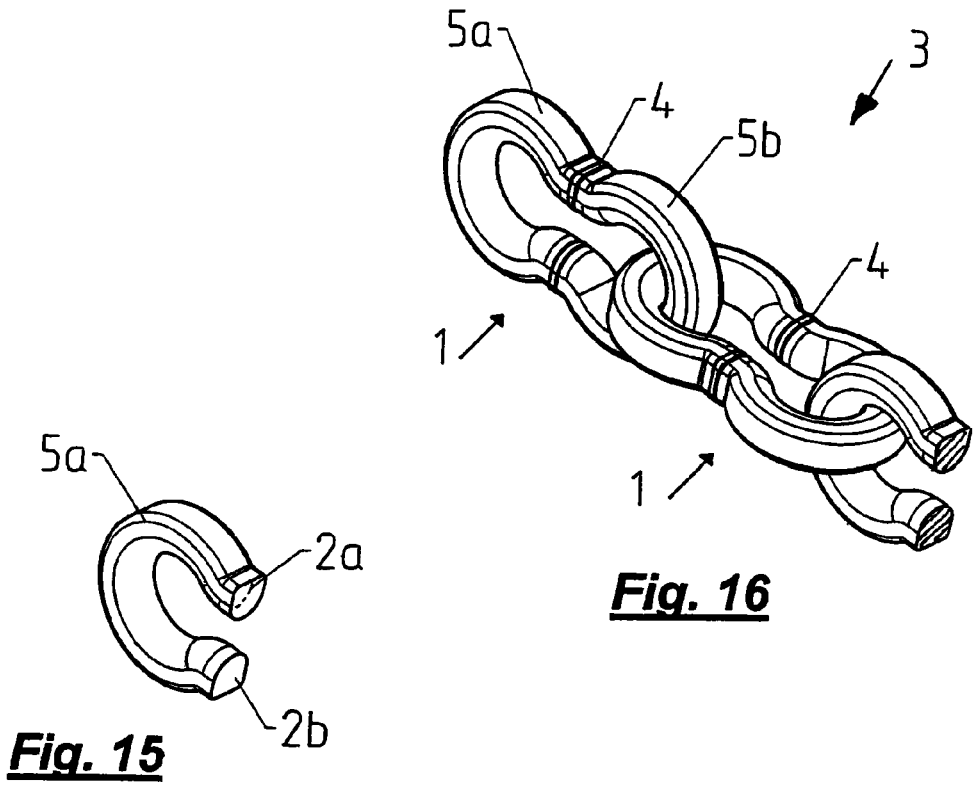
*Fig. 15*
*Fig. 16*
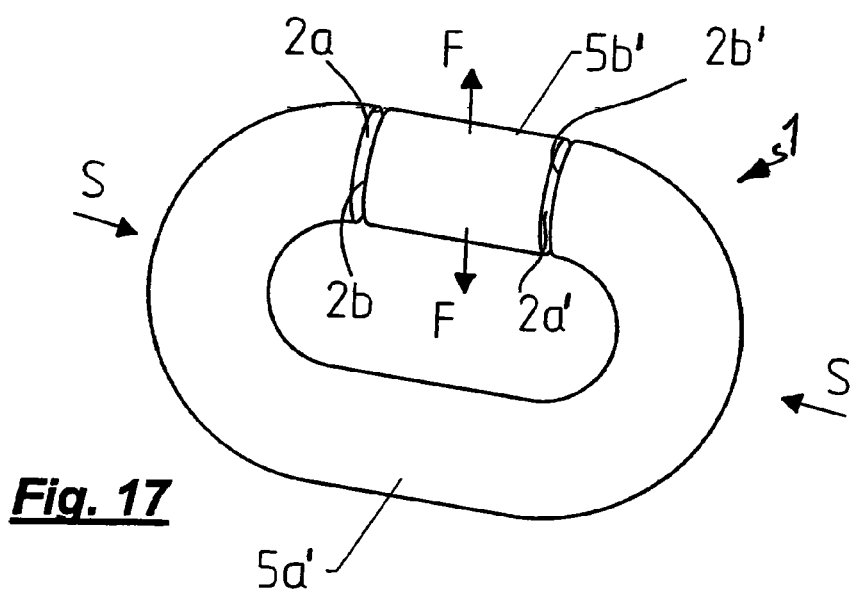
*Fig. 17*

METHOD FOR PRODUCING WELDED ROUND AND PROFILE CHAINS, CHAIN LINKS FOR A ROUND OR PROFILE CHAIN AND ROUND OR PROFILE CHAIN MADE OF CHAIN LINKS OF SAID KIND

PRIORITY CLAIM

The present application is a National Phase entry of PCT Application No. PCT/EP2008/010842, filed Dec. 18, 2008, which claims priority from German Application Number 102007061512.6, filed Dec. 20, 2007, the disclosures of which are hereby incorporated by reference herein in their entirety.

FIELD OF THE INVENTION

The invention relates to a method for producing welded round or profile chains made of chain links connected to one another. Furthermore, it also relates to a chain link for a round or profile chain and a round or profile chain constructed from such chain links.

BACKGROUND

Using pre-bent chain links which are still open at one point, which are welded by electrical resistance and flash butt welding to form closed chain links and to form a chain, for producing welded round and profile steel chains is known.

These chain links are typically produced from wire rolls (coils) or from bars (in the case of diameters from approximately 22 mm), the latter being cut on bending machines into individual stubs (pins), these being bent into open chain links, and the latter being connected to form a (not yet welded) chain. These pre-bent chain links are finally welded to form peripherally closed links and thus to form the finished chain in resistance butt welding or flash butt welding machines.

As a result of the bending procedure required in this case, only round wires and profile wires having simple cross-sections may be processed into a chain, in contrast, chain links having complicated cross-sections and having varying cross-sections are not producible using the known bending.

The specified welding methods also significantly restrict the scope of the materials and alloys usable for the chain production, so that, for example, steels having carbon contents of greater than 0.25% are no longer weldable using the listed fusion welding methods because of the danger of cracking occurring upon bending. The known friction welding methods, using which steels having higher carbon contents and many other iron and nickel alloys may also be welded, is precluded for the welding of such pre-bent chain links, however, because the butt surfaces to be welded must be moved oscillating relative to one another and in parallel in an axially-deviating manner during the friction welding, which is not feasible in the case of pre-bent chain links because of the danger of a fatigue fracture.

SUMMARY OF THE INVENTION

Embodiments of the invention are based on proposing a novel production method for producing welded round and profile chains, in the case of which significantly more materials may be used for the chain links than the materials usable in the case of pre-bent chain links up to this point and greatly varying cross-sectional and chain link shapes may be implemented.

This is achieved according to an embodiment of the invention in the case of a method for producing welded round and profile chains made of chain links connected to one another in that the chain links are each produced from two chain link parts, which are connected to one another by friction welding.

The use according to an embodiment of the invention of two chain link parts to produce a peripherally closed chain link provides the possibility for the first time of actually being able to use friction welding methods, which have been viewed as unusable up to this point in the case of the welding of chain links. The axially-deviating relative movement of the butt surfaces during the friction welding in a manner oscillating and parallel to one another no longer must be compensated for within the chain link itself, as in the case of a pre-bent chain link which is only open at one point, thus resulting in a danger of fatigue fracture. Rather, in the case of an embodiment of the invention, chain link parts, are only connected to one another by friction welding and are not connected to one another before the welding. One is fixed and only the other is moved relative thereto or both are also moved relative to one another without these relative movements having to be absorbed as stress and compensated for within the same part.

The terminal surfaces of the chain link parts facing toward one another each press against one another or against a friction disc lying between them over their entire area and may each rub on one another over their entire area upon movement relative to one another, the terminal surfaces of each chain link part being heated over their entire surface area by the occurring friction to the desired temperature for friction welding through the relative movement of both chain link parts to one another or by the movement of a friction disc situated between the parts.

All terminal surfaces of each chain link part may preferably be provided oriented parallel to one another and flat and also perpendicular to the longitudinal axis of the chain link, for example, whereby the heating procedure required for friction welding can be achieved particularly simply in the terminal surfaces of each chain link part during the relative movement of the chain link parts to one another (or a friction disc relative thereto).

Instead of flat terminal surfaces, however, suitable profiled terminal surfaces, which are shaped complementary to one another, for example, may also be used, which ensure that two surfaces rubbing on one another are each heated by friction over their entire surface area during the rubbing procedure.

The restrictions given in the case of the methods known up to this point, that, on the one hand, chain links having complicated and differing cross-sections are not producible, because they may not be produced using bending and thus also may not be pre-bent in the required way. Also, the restriction resulting in the case of the welding methods used up to this point for the chain welding with respect to the usable materials is also no longer given in the case of the production method according to an embodiment of the invention.

In the case of the production method according to an embodiment of the invention, the chain link parts used may also be pre-bent, but are also producible by similarly using other production technologies. Thus, for example, the chain link parts may also be forged, cast, or produced using sintering technology in the case of the method according to an embodiment of the invention, for example, without any restriction resulting in this regard in the case of the method according to an embodiment of the invention. Greatly varying cross-sectional shapes and chain link shapes may similarly be implemented, because the performance of the production method according to an embodiment of the invention is no longer bound to the bending shaping method for the chain links.

In addition, chain links made of greatly varying materials, for example, made of metals, steels, or alloys, or even made of thermoplastics or plastic/metal composite materials, may be implemented, because the restrictions which result upon use of the resistance or flash butt welding method do not apply in the case of the friction welding method used according to an embodiment of the invention. It is thus possible according to an embodiment of the invention to produce welded chains which are clearly superior to the known chains with respect to wear resistance, in particular with respect to lower surface pressure in the link rounding contact surfaces, and with respect to tensile, bending, torsion, thrust, and shear strength. Steels having carbon contents of greater than 0.25% and similarly also steels and non-ferrous metals which are otherwise only weldable with difficulty using resistance and flash butt welding, such as aluminum, copper, and titanium, may also be welded well to form a chain using the friction welding method. Even welding of different metals for the individual chain link parts of a single chain link, such as aluminum with steel, copper with steel, etc., is possible using the friction welding method used according to an embodiment of the invention. However, the production method according to an embodiment of the invention is not suitable for the welding of one-piece pre-bent chain links of the type always known up to this point, because of the above-mentioned danger of fatigue fracture.

The production method according to an embodiment of the invention can also be optimally used for chain mass production, in the case of the friction welding, after the heating phase of the weld butt joints, a final compression procedure also being executed as in the case of the other known methods, which ends the welding in a defined manner. The production method according to an embodiment of the invention may thus also be optimally used for welds in rapid sequence. Using the production method according to an embodiment of the invention, rust-resistant steels or even powder-coated steels, etc., may be readily welded and used for chain production for the first time. The chain link parts to be welded also do not require any special preparation or processing, because irregularities at the weld butt points may be simply "rubbed away" before the welding.

Half links are preferably used as the chain link parts in the case of the method according to an embodiment of the invention, so that each chain link is prepared from two half links, which allows not only cost-effective, but also particularly rapid production.

For specific uses, it can also be advantageous to use chain link parts of different sizes for the production of a chain link, whereby predefined requirements on the part of the user may be taken into consideration for a particularly flexible and advantageous arrangement.

In connection therewith, it can also be advantageous to use chain link parts having different profile cross-sections.

Through the production method according to an embodiment of the invention, the design possibilities both with respect to the shapes and also with respect to the employed materials and the adaptation to special requirements may be significantly increased in relation to the production methods known up to this point using one-piece, pre-bent chain links.

In a particularly favorable embodiment of the method according to an embodiment of the invention, chain link parts made of sintered material are used, which can be very advantageous in particular with respect to the cost-effectiveness of the manufacturing.

For special applications, however, it can also be advantageous if chain link parts made of nonferrous materials are used in the method according to an embodiment of the invention. For example, chain link parts made of aluminum, titanium, copper, magnesium, and their alloys, whereby a very great and flexible adaptability to special requirements of the user of such chains is provided.

In the case of the production method according to an embodiment of the invention, the employed friction welding method step can fundamentally be performed using any known friction welding technology. However, linear friction welding, orbital friction welding, and the Friex process are very particularly preferably suitable here.

The terminal or butt surfaces of the individual chain link parts to be welded to one another may fundamentally be provided arbitrarily in the case of the production method according to an embodiment of the invention, if their configuration allows the application of the friction welding technology at all. However, the butt surfaces are particularly preferably implemented and situated so that in the case of each chain link, the friction welding is performed along a welding plane lying in a plane of separation of the chain link.

Through the use of friction welding in the case of the production method according to an embodiment of the invention in connection with the use of chain link parts to produce one chain link in each case, the possibility is surprisingly provided of being able to produce chains from ferrous and nonferrous metal alloys, even from rust-free steels or powder-coated steels, or even from thermoplastic materials or from plastic/metal composite materials, which was not possible up to this point and was also not conceivable and is thus made usable for the first time for chain production. This and the great expansion of the design capabilities for the shape of the chain links used due to the production method according to an embodiment of the invention provide great progress in the field of the production of welded round and profile chains.

In addition, an embodiment of the invention also provides a chain link for a round or profile chain, which is producible simply and cost-effectively and permits significantly greater design possibilities than known chain links with respect to its shaping and also the material usable therein. This is achieved according to an embodiment of the invention in the case of a chain link for a round or profile chain in that it comprises two chain link parts which are connected to one another by friction welding.

The construction according to an embodiment of the invention of a chain link provides the same advantages for its shaping and also for the usable materials as were already described above in connection with the production method according to an embodiment of the invention, to which reference is made.

It is particularly advantageous if, in the case of a chain link according to an embodiment of the invention, the chain link parts are two half links, i.e., it is constructed from two half links which are connected to one another by friction welding. This is a particularly cost-effective and simple construction, which also allows a rapid welding procedure.

For specific uses, it can also be advantageous in the case of a chain link according to an embodiment of the invention if the chain link parts have different shapes, in particular different profile cross-sections, whereby flexible and very good adaptability to the requirements of special uses is achieved.

In the case of a chain link according to an embodiment of the invention, the chain link parts may preferably be sintered parts for many uses, which results in the fundamentally achievable advantages in the case of the use of sintered parts.

The chain link according to an embodiment of the invention can be produced from greatly varying metals, steels, and their alloys, and also from non-ferrous metals. For the chain link according to an embodiment of the invention, the chain link parts are particularly preferably manufactured from a case-hardened steel or tempered steel having a carbon content of greater than 0.25%, whereby a significant improvement may be achieved in the strength properties in relation to known chains. However, the chain link parts may also advantageously comprise thermoplastic or a plastic/metal composite material, for example, aluminum on the interior and plastic on the exterior of the chain link.

The chain link parts of a chain link according to an embodiment of the invention preferably comprise high-alloyed rust-resistant, austenitic, martensitic, ferritic, or ledeburitic steel, whereby particularly good wear resistance and tensile, bending, torsion, thrust, and shear strength of such a chain link according to an embodiment of the invention may be achieved.

BRIEF DESCRIPTION OF THE DRAWINGS

Embodiments of the invention are explained in greater detail hereafter in principle for exemplary purposes on the basis of the drawing. In the figures:

FIG. 1 depicts a pre-bent chain link;
FIG. 2 depicts multiple pre-bent chain links connected to one another to form a chain;
FIG. 3 depicts the chain link from FIG. 2, now as peripheral links welded to form a welded chain;
FIGS. 6, 7, and 8 each depict two half links to be connected to one another by orbital friction welding;
FIG. 9 depicts another form of a half link according to an embodiment of the invention;
FIG. 10 depicts a welded chain according to an embodiment of the invention comprising half links corresponding to FIG. 9;
FIG. 15 depicts a further embodiment of a half link according to an embodiment of the invention;
FIG. 16 depicts a welded chain produced from half links according to FIG. 15,
and
FIG. 17 depicts a further embodiment of a chain link producible from two chain link parts by friction welding.

DETAILED DESCRIPTION

Figure 1:
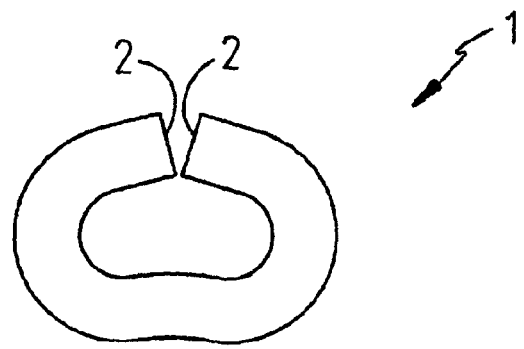
FIG. 1 through FIG. 3 depict the prior art, namely
Figure 2:
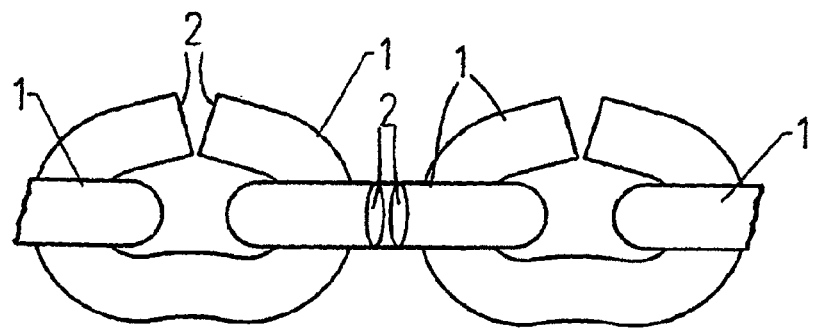
Figure 3:
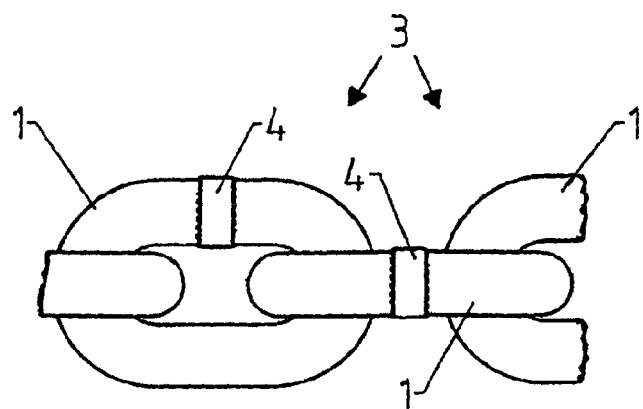

The chain links or chain parts constructed therefrom shown in FIGS. 1 through 3 illustrate the prior art.

FIG. 1 shows a pre-bent chain link 1 for this purpose. Such chain links 1 may be produced from wire drawn off of wire rolls (coils) or from bars (in the case of wire diameters from approximately 22 mm), which are then cut on bending machines into individual stubs (pins) and bent into chain links 1. The terminal surfaces of the pre-bent chain links 1 are still relatively far away from one another, so that the individual chain links 1 may be hung one inside another to form a chain according to FIG. 1. Next, after which the distance between the two terminal surfaces 2 of the pre-bent chain link 1 is reduced so that, as shown in FIG. 2, the chain links 1 connected to one another may no longer be detached from one another, because the passage cross-section between the terminal surfaces 2 of the open ends of each chain link 1 is too small to permit the full material thickness of the bent leg of the suspended adjacent link to pass through. The chain links 1 of the illustration from FIG. 2 are then connected to one another using resistance butt welding or flash butt welding by subsequent welding of the particular two terminal surfaces 2a, 2b of each pre-bent chain link 1, whereby the finished produced welded chain 3 results, as shown in FIG. 3, in which the welded joints 4 are also obvious.

The production of a pre-bent chain link 1, as shown in principle in FIG. 1, requires a bending procedure, using which only round or profile wires having simple cross-sections may be processed to form a welded chain 3. Chain links having more complicated cross-sections or different cross-sections may not be produced using such a bending procedure. Also, only specific alloys and metals may be used because of the listed welding methods. In particular, steels having carbon contents of greater than 0.25% are no longer weldable using the listed fusion welding methods because of the danger of cracking occurring.

Figure 4:
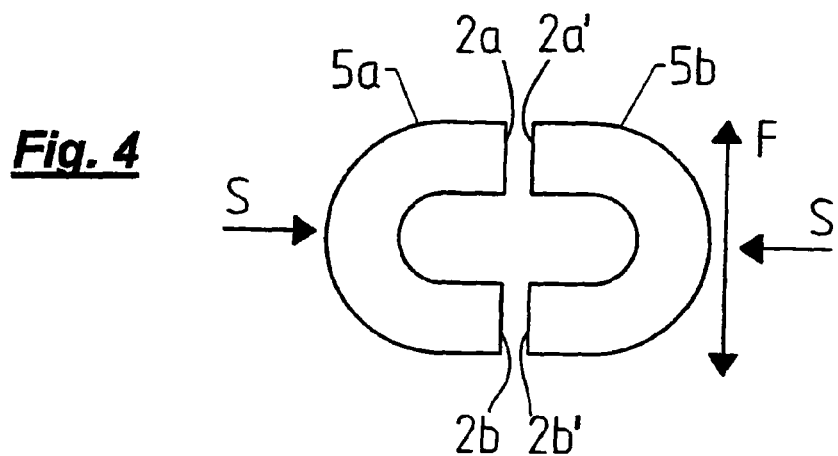
FIGS. 4 and 5 each depict two half links to be connected to one another to form a closed chain link by linear friction welding.
Figure 5:
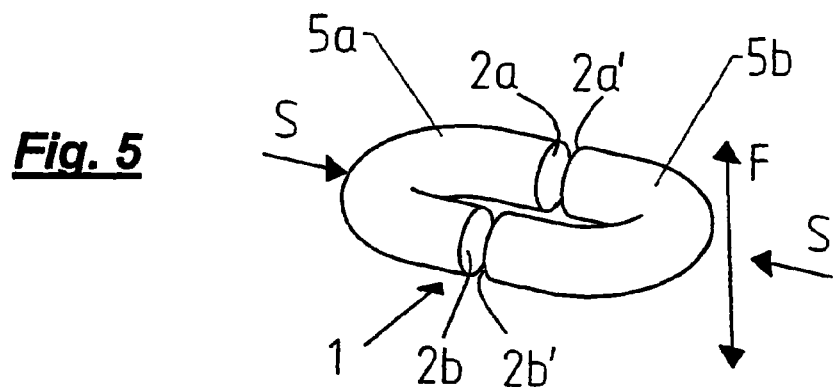

In FIGS. 4 and 5, two chain links 1 according to an embodiment of the invention are shown, which are each producible from two chain link parts 5a, 5b in the form of half links, which may be connected to one another using a friction welding method, namely using linear friction welding. For this purpose, one of the two parts, e.g., 5a, is held unchanged in its location, while the other part 5b is caused to oscillate in the direction of the arrows F in a suitable manner. The two terminal surfaces 2a, 2b of one part 5a, which are each flat, are pressed against the terminal surfaces 2a', 2b' of the other part 5b, which are also flat, heating of the terminal surfaces 2a, 2b and 2a', 2b' of both parts 5a, 5b being caused over their entire surface by the oscillation of the part 5b. As soon as these terminal surfaces 2a, 2b and 2a', 2b', which rub against one another, have been sufficiently strongly heated as a result of the friction, they are pressed against one another by an axially oriented compression force S in more precise orientation to one another and the desired weld bond is thus produced at the welded joint 4 over their entire surface extension.

The chain link 1 from FIG. 5 comprises two half links 5a, 5b of the type already known from FIG. 4. The half link 5a is not being fixed here and the half link 5b is not being moved by oscillation in the shared spanning plane of both half links in the way shown in FIG. 4. Rather, both half links 5a, 5b each oscillate back and forth to one another perpendicular to their spanning planes and in movement in opposite directions, in order to generate the desired welding temperature on the flat terminal surfaces 2a, 2b and 2a', 2b', which are again pressed against one another, over the entire surface extension of each terminal surface 2a, 2b, 2a', 2b'. These opposing linear oscillations are indicated in FIG. 5 by the arrows F and F'.

Figure 6:
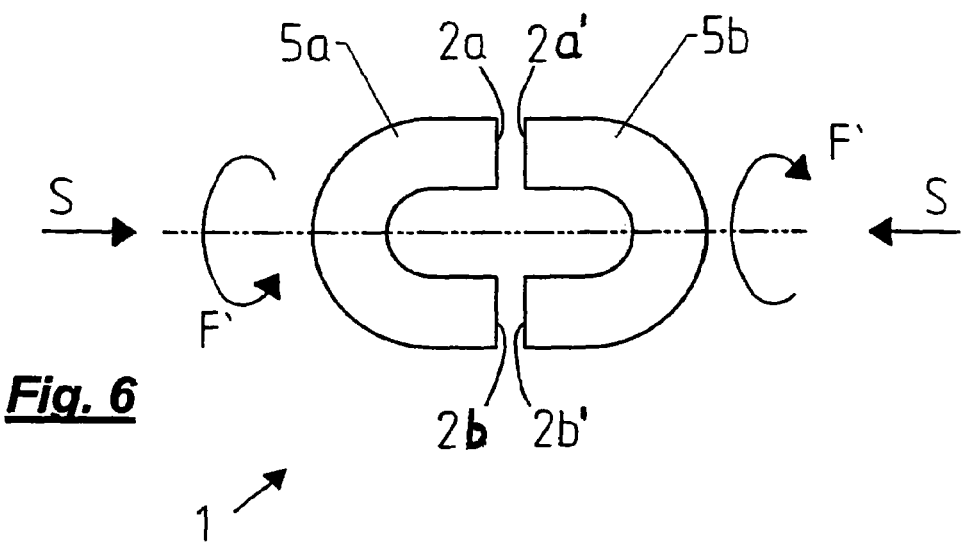

Instead of the linear relative movements of the chain link parts 5a and 5b to one another to heat the particular terminal surfaces 2a, 2b and 2a', 2b' using a linear relative movement shown in FIGS. 4 and 5, however, the possibility also exists of performing this relative movement on the terminal surfaces 2a, 2b and 2a', 2b' by a suitable relative movement of the two chain link parts 5a and 5b in the meaning of a rotational movement F', during which the flat terminal surfaces 2*a*, 2*b* and 2*a*', 2*b*' are again pressed against one another in the axial direction S. This relative movement in the form of a rotational movement F' can occur in any suitable way. Thus, for example, one of the two chain link parts 5*a* or 5*b* can be fixed in its location and the other can be moved relative thereto by an oscillation in the rotational direction. However, it is also possible that both chain link parts 5*a*, 5*b* are each moved relative to one another in the rotational direction to generate a relative movement of their terminal surfaces 2*a*, 2*b* and 2*a*', 2*b*', which are pressed against one another. This can fundamentally be a rotation in the same direction (although at different rotational velocities), and also preferably a rotational movement oriented in opposite directions, as shown in FIG. 6. The welding procedure is then terminated by applying a compression force S, which is again oriented axially and using which the terminal surfaces 5*a*, 5*b* and 5*a*', 5*b*' are pressed against one another and thus welded at the end of the heating. This type of welding using a rotation of the terminal sections is referred to as the orbital welding method.

Two further possibilities for welding the two chain link parts 5*a* and 5*b* are shown in FIGS. 7 and 8:

A rotating disk 6 is attached in each case here between the terminal surfaces 2*a* and 2*a*' and 2*b* and 2*b*' facing toward one another of the two chain link parts 5*a* and 5*b*, against which the flat terminal surfaces 2*a*, 2*b*, 2*a*', and 2*b*' of the chain link parts 5*a* and 5*b* may be pressed in a friction-locked manner over their entire extension, an axially acting compression force S again being applied after achieving the desired welding temperature and welding of the two chain link parts 5*a* and 5*b* in precise orientation to one another occurring with the disk 6.

In FIG. 8, instead of the rotating disk 6, a linear plate in the form of an oscillating disk 7 is provided, which oscillates in a plane parallel to the flat terminal surfaces 2*a*, 2*b* and 2*a*', 2*b*'. The two chain link parts 5*a* and 5*b* pressed in the direction toward one another (and each against the oscillating disk 7) by action of the axial compression force S and, in orientation with one another, welded to the latter, again after reaching the desired welding temperature.

The friction welding methods shown in FIGS. 7 and 8 are referred to as the so-called Friex processes.

FIG. 9 shows another form of a chain link part 5*a*, again in the form of a half link, which corresponds to the division of a chain link 1 in a central plane perpendicular to its spanning plane.

A chain 3 produced from such chain link parts 5*a* and 5*b* by friction welding is shown in FIG. 10.

As can be seen immediately from a comparison of the chains from FIGS. 3 and 10, the welded joints 4 of the individual chain links 1 are offset by 90° in the case of the chains of the two embodiments, viewed in the peripheral direction of each chain link 1.

However, it is to be noted that the welded joints 4 on one chain link 1 may fundamentally be situated at any arbitrary location and the embodiments illustrated in the figures only show special exemplary embodiments.

In addition to the embodiments for chains 3, as shown in FIGS. 3 and 9, however, the possibility also fundamentally exists that the chain links 1 of each chain 3, which are connected to one another, are not necessarily all of identical shape.

Figure 11:
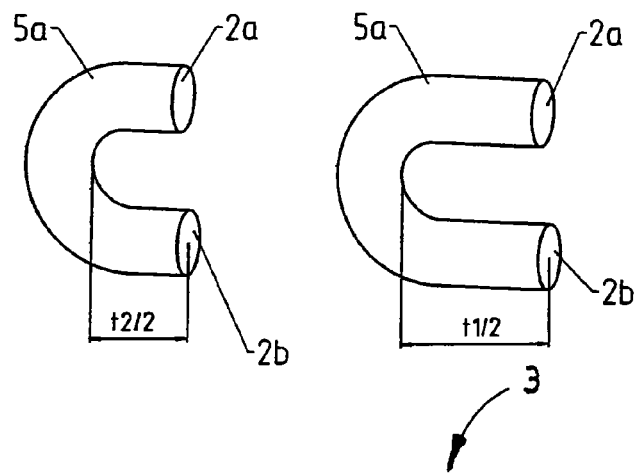
FIG. 11 depicts two different implementations in the form of half links according to an embodiment of the invention of different lengths.
Figure 12:
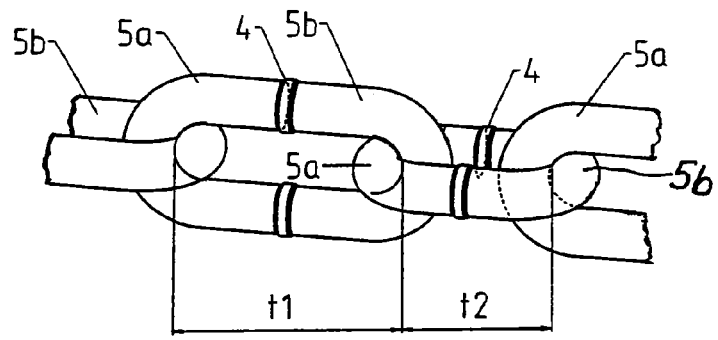
FIG. 12 depicts a chain according to an embodiment of the invention, constructed from the chain links according to FIG. 11, having chain link divisions of different lengths.

Thus, for example, in FIG. 11, two chain link parts 5*a* and 5*a*' are shown (each in the form of a half link), which are provided for producing chain links 1 having pitches of unequal sizes, which are alternately connected to one another in the course of the chain corresponding to FIG. 12. While the chain link part 5*a* shown on the left in FIG. 11 is provided for the production of a chain link 1 having the pitch t2, the chain link part 5*a*' shown on the right in FIG. 11 is intended for producing a chain link 1' having a greater pitch t1. A chain 3 results, as shown in FIG. 12, in which the individual chain links 1 or 1' alternately have leg lengths of unequal length.

Figure 13:
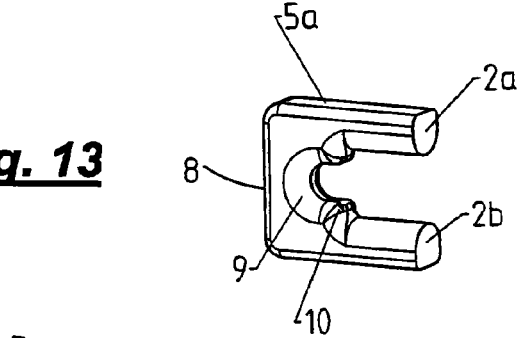
FIG. 13 depicts still another form of a half link according to an embodiment of the invention.

A further different shape for a chain link part 5*a* is shown in FIG. 13. The external contour of the chain links 1 which are producible from such chain link parts 5*a* is rectangular.

Figure 14:
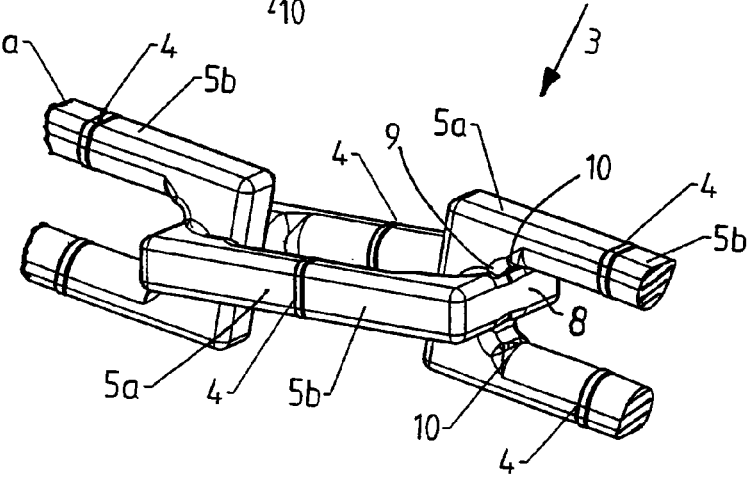
FIG. 14 depicts an embodiment of a chain according to an embodiment of the invention comprising half links according to FIG. 13.

Through a rounded recess 9 is applied to the interior of the bow 8 of such a chain link part 5*a* and beads 10 provided on its ends, as the chain 3 in FIG. 14 shows, a preferred angling between the two chain links 1 is established upon rotation of two sequential chain links 1 by cooperation of the beads 10 with the outer edge of the angled chain link part 5*a*.

Still another variant of a chain link part 5*a* is shown in FIG. 15, which has a curved shape favorable for bending with respect to the later stress distribution in the chain, using which tensile stresses in the edge fibers of the chain link may be reduced. FIG. 16 shows a chain 3 constructed from such chain link parts 5*a*.

Furthermore, as is obvious from FIGS. 13 and 15, the chain link parts 5*a*, 5*b* shown therein each have a noncircular profile cross-section at the terminal surfaces 2*a*, 2*b* in the case of the material strand used. However, this is only shown as an example, of course, other profile cross-sections could also be used here, which have any rounded, in particular oval or circular cross-sectional shape.

Finally, a chain link 1 is shown in FIG. 17, which comprises two chain link parts 5*a* and 5*b*, neither of which is implemented as a half link, however, and are significantly different from one another in their shape.

The one, larger chain link part 5*a* forms one of the two long legs having the bow parts 12 attached on its ends, while the second chain link part 5*b*' represents a linear, larger section of the other long leg of this chain link 1 opposite to the long leg 11.

In this embodiment, the particular terminal surfaces 2*a* and 2*a*' to be welded are offset to one another in the axial direction so that the welded joints arising upon welding are no longer in a common welding plane, so that two welding planes offset to one another must be used for the friction welding. This differentiates this chain link form from all chain link forms of the preceding figures, in which the welded joints 4 of each chain link 1 were always in a common welding plane.

In the chain link form according to FIG. 17, the two chain link parts 5*a*' and 5*b*' can also be moved in their relative movement to one another (during the performance of the friction welding procedure) both in the form of a linear relative movement and also in the form of a rotating relative movement. Thus, for example, the large chain link part 5*a*' can be fixed in its location and the small chain link part 5*b*' can either oscillate within the spanning central plane (arrow F) of the chain link 1 or perpendicular thereto, or also the smaller chain link part 5*b*' can be fixed and the larger chain link part 5*a*' can be moved by oscillating relative to the first in the two cited planes.

On the other hand, however, the larger chain link part 5*a*' can also be similarly fixed, for example, and the smaller chain link part 5*b*' can be pivoted around its longitudinal axis, always in the same rotational direction or also oscillating.

In the case of the structure of the chain link 1 shown in FIG. 17, for the application of the particular flat terminal surfaces 2*a*, 2*a*' and 2*b*' to be welded, a pressure force which is active in the longitudinal direction of the smaller chain link part 5*b*' must be provided in a strength which has a dimension sufficient for the pressing the terminal surfaces 2*a* and 2*a*' and 2*b* and 2b' against one another. The welding procedure is also again ended here by application of a compression force S of sufficient size to generate the contact pressure required for the welding at the various surfaces to be welded to one another.

It is obvious that the chain link 1 may also be assembled in a plurality of further possibilities from two chain link parts which are each implemented differently, and which may be connected to one another using friction welding according to one or all of the listed friction welding methods. The terminal surfaces 2a, 2b, 2a', 2b' rubbing against one another may also be implemented other than flat (in a form complementary to one another): however, their shaping must ensure that friction contact exists over the entire terminal surface in each case (if the two terminal surfaces to be welded to one another are oriented toward one another) and the relative movement of the terminal surfaces to one another can also be executed unobstructed in the event of continuing friction contact.

A large plurality of profile cross-sections is similarly also usable for such chain link parts connectable to one another using friction welding, without restrictions in the selection of the profile cross-section being maintained for this purpose as in the case of parts to be pre-bent (as in the known prior art).

The invention claimed is:

1. A method for producing welded round and profile chains made of a plurality of chain links which are connected to one another, the method for joining each chain link of the plurality comprises:
   providing a pair of chain link parts which when paired together having a plane of separation;
   linear friction welding the two chain link parts together along a welding plane lying in the plane of separation of said chain link parts thereby forming a chain link.

2. The method according to claim 1, further comprising providing half links as the chain link parts.

3. The method according to claim 1, further comprising providing unequal sized parts for producing each of the chain links.

4. The method according to claims 1, further comprising providing different shaped chain link parts for producing each link.

5. The method according to claim 4, further comprising providing different profile cross-sections for each of the chain link parts for producing each link.

6. The method according to claim 1, further comprising providing chain link parts formed of sintered material for producing each link.

7. The method according to claim 1, further comprising providing chain link parts formed of non ferrous metals for producing each link.

8. A chain link for a round or profile chain, comprising:
   a first chain link part; and
   a second chain link part, wherein the first and second chain link parts are connected by a linear friction welded bond, wherein the chain link parts are connected together along a welding plane lying in a separation plane of said chain link.

9. The chain link according to claim 8, wherein the chain link parts are two half links.

10. The chain link according to claim 8, wherein the chain link parts have different shapes having different profile cross-sections.

11. The chain link according to claim 8, wherein the chain link parts are sintered parts.

12. The chain link according to claim 8, wherein the chain link parts comprise a case-hardened steel or tempered steel having a carbon content of greater than 0.25%.

13. The chain link according to claim 8, wherein the chain link parts comprise rust-resistant, austenitic, martensitic, ferritic, or ledeburitic steel.

14. The chain link according to claim 8, wherein the chain link parts comprise a thermoplastic or a plastic/metal composite material.

15. The chain link according to claim 8 wherein the chain link is one of a plurality of chain links connected to one another by linear friction welding to construct a round or profile chain.

16. The chain link according to claim 15, wherein the round or profile chain uses chain links where each two chain links of the plurality of chain links connected to one another have divisions of different lengths.

17. A round or profile chain, comprising:
   a plurality of chain links, interconnected to one another as a series of peripherally closed chain links, each chain link including:
   a first chain link part; and
   a second chain link part, the first and second chain link parts connected to one another by a linear friction welded bond, wherein the chain link parts are connected together along a welding plane lying in a separation plain of said chain link.

18. The round or profile chain according to claim 17, wherein each of two chain links connected to one another of the plurality of chain links have divisions of different lengths.

* * * * *

UNITED STATES PATENT AND TRADEMARK OFFICE
CERTIFICATE OF CORRECTION

PATENT NO. : 8,186,141 B2  
APPLICATION NO. : 12/809811  
DATED : May 29, 2012  
INVENTOR(S) : Horst-Hannes Cerjak et al.

Page 1 of 1

It is certified that error appears in the above-identified patent and that said Letters Patent is hereby corrected as shown below:

Title page, add an additional Assignee as listed on the recorded Assignment:

"(73) Assignee:    Technische Universitaet Graz, Graz (AT)"

should be:

--(73) Assignee:    pewag Austria GmbH, Kapfenberg (AT)  
Technische Universitaet Graz, Graz (AT)--

Signed and Sealed this  
Eleventh Day of December, 2012

David J. Kappos  
*Director of the United States Patent and Trademark Office*